(12) United States Patent
Stewart et al.

(10) Patent No.: US 8,339,618 B2
(45) Date of Patent: Dec. 25, 2012

(54) METHOD AND APPARATUS FOR CONFIRMING ATTRIBUTES OF MEDIA LOADED IN A MEDIA TRAY IN AN IMAGE PRODUCTION DEVICE

(75) Inventors: David Shawn Stewart, Hertford (GB); Gemma Rosalind Lee, Essex (GB); Lee James O'Brien, Welwyn Garden (GB)

(73) Assignee: Xerox Corporation, Norwalk, CT (US)

( * ) Notice: Subject to any disclaimer, the term of this patent is extended or adjusted under 35 U.S.C. 154(b) by 563 days.

(21) Appl. No.: 12/417,825

(22) Filed: Apr. 3, 2009

(65) Prior Publication Data
US 2010/0253952 A1    Oct. 7, 2010

(51) Int. Cl.
*G06K 15/00* (2006.01)

(52) U.S. Cl. ......... 358/1.12; 358/1.15; 358/1.6; 399/45; 399/85

(58) Field of Classification Search .................. 358/1.9, 358/1.15, 1.12, 1.6; 399/45
See application file for complete search history.

(56) References Cited

U.S. PATENT DOCUMENTS

| | | | |
|---|---|---|---|
| 5,835,820 A * | 11/1998 | Martin et al. | 399/85 |
| 6,356,719 B1 * | 3/2002 | Yoshiura | 399/45 |
| 6,768,883 B2 | 7/2004 | Wiegand et al. | |
| 6,845,977 B2 | 1/2005 | Leveto et al. | |
| 6,850,337 B1 * | 2/2005 | Pentecost et al. | 358/1.15 |
| 7,649,642 B2 * | 1/2010 | Bos et al. | 358/1.15 |
| 2007/0143696 A1 | 6/2007 | McComber | |
| 2007/0146784 A1 | 6/2007 | Perry et al. | |

* cited by examiner

*Primary Examiner* — Marivelisse Santiago Cordero
*Assistant Examiner* — Moustapha Diaby
(74) *Attorney, Agent, or Firm* — Ronald E. Prass, Jr.; Prass LLP

(57) ABSTRACT

A method and apparatus for confirming attributes of media loaded in a media tray in an image production device is disclosed. The method may include determining which media tray of one or more media trays is being loaded with media using one or more media tray sensors, displaying a graphical representation of the media tray being loaded to a user on a user interface, prompting the user to enter and confirm attributes of the media being loaded into the media tray through the user interface, determining if confirmation has been received from the user interface, wherein if it is determined that the confirmation has been received from the user interface, storing the confirmed attributes for the determined media tray in a memory, and processing print jobs using the stored media tray attributes.

18 Claims, 5 Drawing Sheets

US 8,339,618 B2

METHOD AND APPARATUS FOR CONFIRMING ATTRIBUTES OF MEDIA LOADED IN A MEDIA TRAY IN AN IMAGE PRODUCTION DEVICE

BACKGROUND

Disclosed herein is a method for confirming attributes of media loaded in a media tray in an image production device, as well as corresponding apparatus and computer-readable medium.

In conventional image production devices, it is expected that media for printing will be handled for successive print jobs without reloading. Manipulations in the paper path and orientation of the image are used to ensure the intended output.

When loading media in a media tray with pre-oriented elements, such as pre-punch, or identifiable sides, like labels or pre-printed papers, it may not be clear to the user which direction to properly load this media. This is traditionally handled by providing printed instructions on the tray itself that indicate to the user which direction to load a particular media type.

This process has limitations, particularly in that it is not always possible to concisely represent all possible media type cases. In addition, some of these instructions may be obscured in some manner which may prevent the user from reading. Misloading the orientation of the media can have a variety of impacts, including incorrect placement of job elements, and in some cases, mechanical problems in the paper path. These media loadings are specific to each tray in an image production device and will typically differ between image production devices depending on various design decisions.

SUMMARY

A method and apparatus for confirming attributes of media loaded in a media tray in an image production device is disclosed. The method may include determining which media tray of one or more media trays is being loaded with media using one or more media tray sensors, displaying a graphical representation of the media tray being loaded to a user on a user interface wherein the graphical representation shows a feed orientation for the media, prompting the user to enter and confirm attributes of the media being loaded into the media tray through the user interface, wherein the attributes are at least one of media type, media size, and media color, and the media type is one of envelope, punched, label, and preprinted media, determining if confirmation has been received from the user interface, wherein if it is determined that the confirmation has been received from the user interface, storing the confirmed attributes for the determined media tray in a memory, and processing print jobs using the stored media tray attributes.

DETAILED DESCRIPTION

Figure 1:
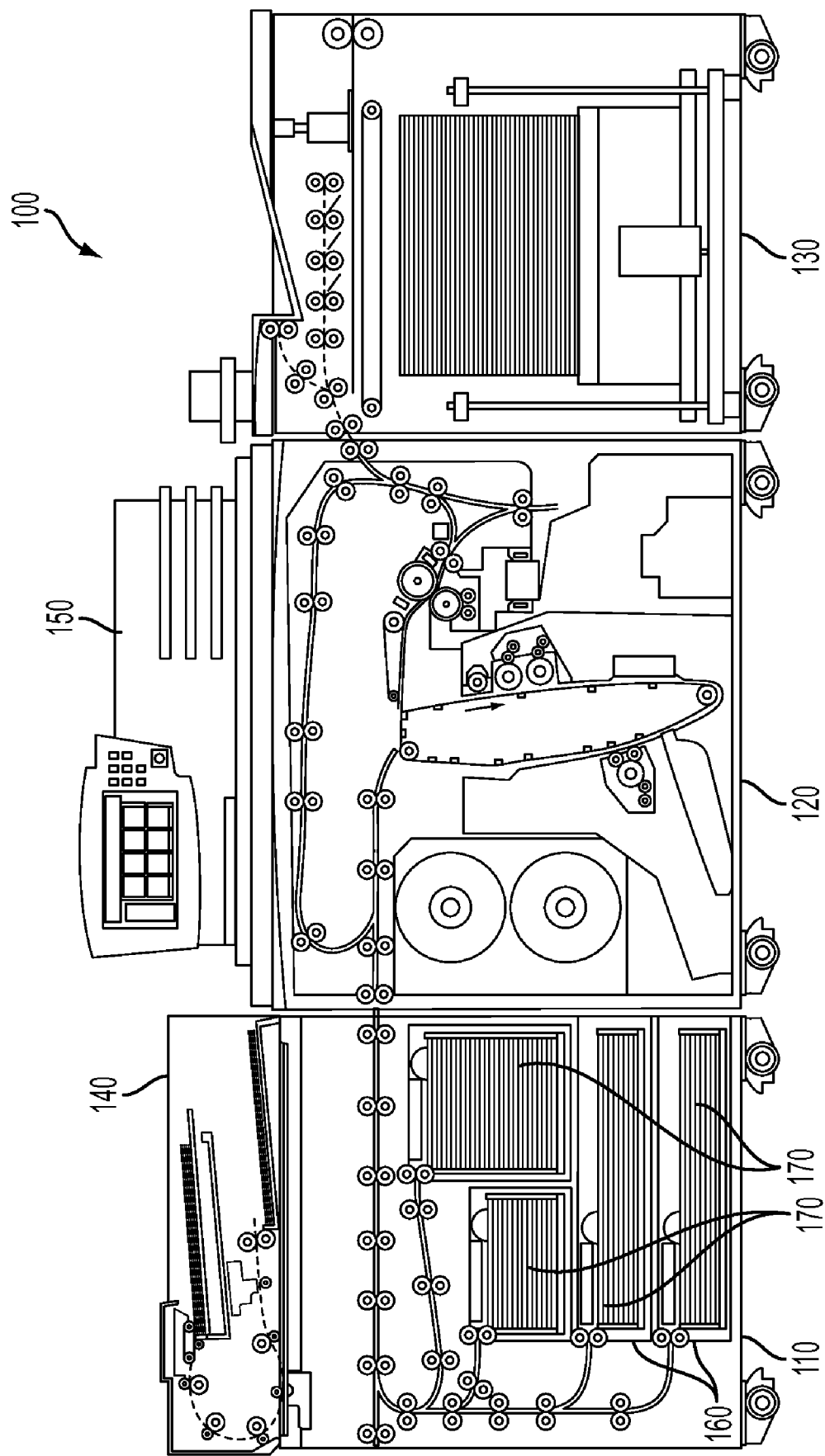
FIG. 1 is an exemplary diagram of an image production device in accordance with one possible embodiment of the disclosure.

Aspects of the embodiments disclosed herein relate to a method for confirming attributes of media loaded in a media tray in an image production device, as well as corresponding apparatus and computer-readable medium.

The disclosed embodiments may include a method confirming attributes of media loaded in a media tray in an image production device. The method may include determining which media tray of one or more media trays is being loaded with media using one or more media tray sensors, displaying a graphical representation of the media tray being loaded to a user on a user interface, wherein the graphical representation shows a feed orientation for the media, prompting the user to enter and confirm attributes of the media being loaded into the media tray through the user interface, wherein the attributes are at least one of media type, media size, and media color, and the media type is one of envelope, punched, label, and preprinted media, determining if confirmation has been received from the user interface, wherein if it is determined that the confirmation has been received from the user interface, storing the confirmed attributes for the determined media tray in a memory, and processing print jobs using the stored media tray attributes.

The disclosed embodiments may further include an image production device that may include a memory that stores media tray attributes of media contained in one or more media tray, a user interface that displays items to a user and receives inputs from the user, one or more media trays that store media used for image production, one or more media tray sensors that determine which media tray of the one or more media trays is being loaded with media, and a media tray confirmation module that causes a graphical representation of the media tray being loaded to be displayed to a user on the user interface, prompts the user to enter and confirm attributes of the media being loaded into the media tray through the user interface, determines if confirmation has been received from the user interface, wherein if the media tray confirmation module determines that the confirmation has been received from the user interface, the media tray confirmation module stores the confirmed attributes for the determined media tray in the memory, and processes print jobs using the stored media tray attributes, wherein the graphical representation shows a feed orientation for the media, the attributes are at least one of media type, media size, and media color, and the media type is one of envelope, punched, label, and preprinted media.

The disclosed embodiments may further include a computer-readable medium storing instructions for controlling a computing device for confirming attributes of media loaded in a media tray in an image production device. The instructions may include determining which media tray of one or more media trays is being loaded with media using one or more media tray sensors, displaying a graphical representation of the media tray being loaded to a user on a user interface, wherein the graphical representation shows a feed orientation for the media, prompting the user to enter and confirm attributes of the media being loaded into the media tray through the user interface, wherein the attributes are at least one of media type, media size, and media color, and the media type is one of envelope, punched, label, and preprinted media, determining if confirmation has been received from the user interface, wherein if it is determined that the confirmation has been received from the user interface, storing the confirmed attributes for the determined media tray in a memory, and processing print jobs using the stored media tray attributes.

The disclosed embodiments may concern a method and apparatus for confirming attributes of media loaded in a media tray in an image production device. The method may include displaying this information on a graphical user interface (GUI) screen at the time that a user reloads media in a media tray. A user may be prompted to make selections on the GUI to confirm the media. Added to this GUI may be an icon of the media tray with a representation of the media showing where the pre-oriented elements of the media are typically located. The GUI may take account of a number of factors to establish correct loading, including:

Which Tray is being loaded
The Orientation that the media that has been loaded
The Type and Size of the media This information can be combined to give an explicit instruction to the user as to the correct loading of the media tray. In some cases, there may be options which may not be known. One example of these options may be envelopes where a given size may be manufactured with the flap on either the long or the short edge. This process may an improvement over previous GUI screens which either did little to support the user or contradicted the correct loading scheme.

FIG. 1 is an exemplary diagram of an image production device 100 in accordance with one possible embodiment of the disclosure. The image production device 100 may be any device that may be capable of making image production documents (e.g., printed documents, copies, etc.) including a copier, a printer, a facsimile device, and a multi-function device (MFD), for example.

The image production device 100 may include an image production section 120, which includes hardware by which image signals are used to create a desired image, as well as a feeder section 110, which stores and dispenses sheets on which images are to be printed, and an output section 130, which may include hardware for stacking, folding, stapling, binding, etc., prints which are output from the marking engine. If the printer is also operable as a copier, the printer further includes a document feeder 140, which operates to convert signals from light reflected from original hard-copy image into digital signals, which are in turn processed to create copies with the image production section 120. The image production device 100 may also include a local user interface 150 for controlling its operations, although another source of image data and instructions may include any number of computers to which the printer is connected via a network.

With reference to feeder section 110, the module includes any number of media trays 160, each of which stores a media stack 170 or print sheets ("media") of a predetermined type (size, weight, color, coating, transparency, etc.) and includes a feeder to dispense one of the sheets therein as instructed. Certain types of media may require special handling in order to be dispensed properly. For example, heavier or larger media may desirably be drawn from a media stack 170 by use of an air knife, fluffer, vacuum grip or other application (not shown in the Figure) of air pressure toward the top sheet or sheets in a media stack 170. While the term a media stack 170 is used for ease of discussion, the media stack 170 may represent any type of media used to produce documents in the image production device 100, such as any type of paper, plastic, photo paper, cardboard, etc.

Certain types of coated media are advantageously drawn from a media stack 170 by the use of an application of heat, such as by a stream of hot air (not shown in the Figure). Sheets of media drawn from a media stack 170 on a selected tray 160 may then be moved to the image production section 120 to receive one or more images thereon. Then, the printed sheet is then moved to output section 130, where it may be collated, stapled, folded, etc., with other media sheets in manners familiar in the art.

Figure 2:
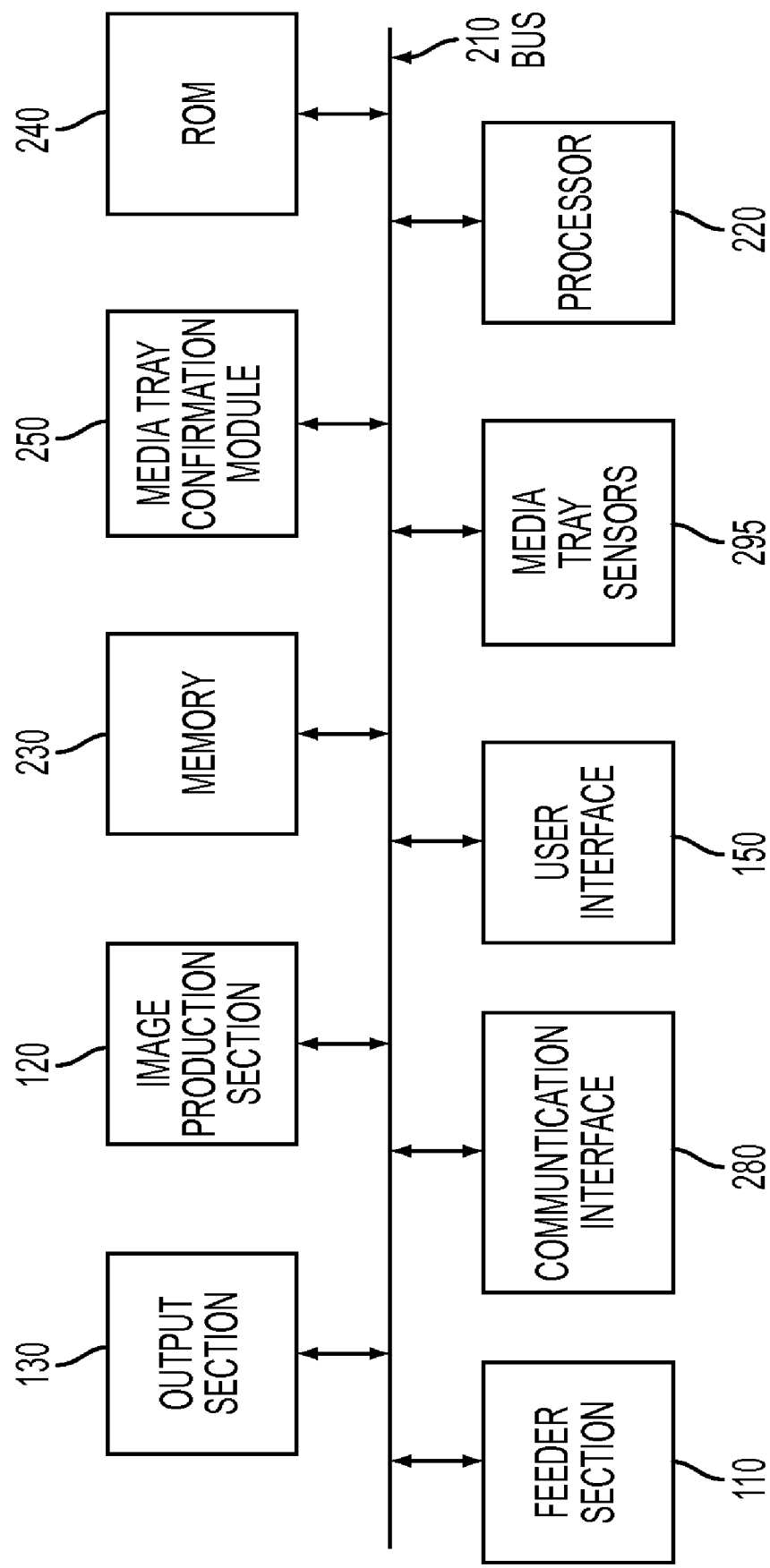
FIG. 2 is an exemplary block diagram of the image production device in accordance with one possible embodiment of the disclosure.

FIG. 2 is an exemplary block diagram of the image production device 100 in accordance with one possible embodiment of the disclosure. The image production device 100 may include a bus 210, a processor 220, a memory 230, a read only memory (ROM) 240, a media tray confirmation module 250, a feeder section 110, an output section 130, a user interface 150, a communication interface 280, an image production section 120, and media tray sensors 295. Bus 210 may permit communication among the components of the image production device 100.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM 240 and may include any type of storage media, such as, for example, magnetic or optical recording media and its corresponding drive.

User interface 150 may include one or more conventional mechanisms that permit a user to input information to and interact with the image production unit 100, such as a keyboard, a display, a mouse, a pen, a voice recognition device, touchpad, buttons, etc., for example. Output section 130 may include one or more conventional mechanisms that output image production documents to the user, including output trays, output paths, finishing section, etc., for example. The image production section 120 may include an image printing and/or copying section, a scanner, a fuser, a spreader, etc., for example.

The image production device 100 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280. Media tray sensors 295 may represent any sensors known to one of skill in the art that may sense that a media tray 160 has been accessed for loading.

The image production device 100 illustrated in FIGS. 1-2 and the related discussion are intended to provide a brief, general description of a suitable communication and processing environment in which the disclosure may be implemented. Although not required, the disclosure will be described, at least in part, in the general context of computer-executable instructions, such as program modules, being executed by the image production device 100, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like.

The operation of the media tray confirmation module 250, the media tray sensors 295, and the media tray confirmation process will be discussed in relation to the flowchart in FIG. 3.

Figure 3:
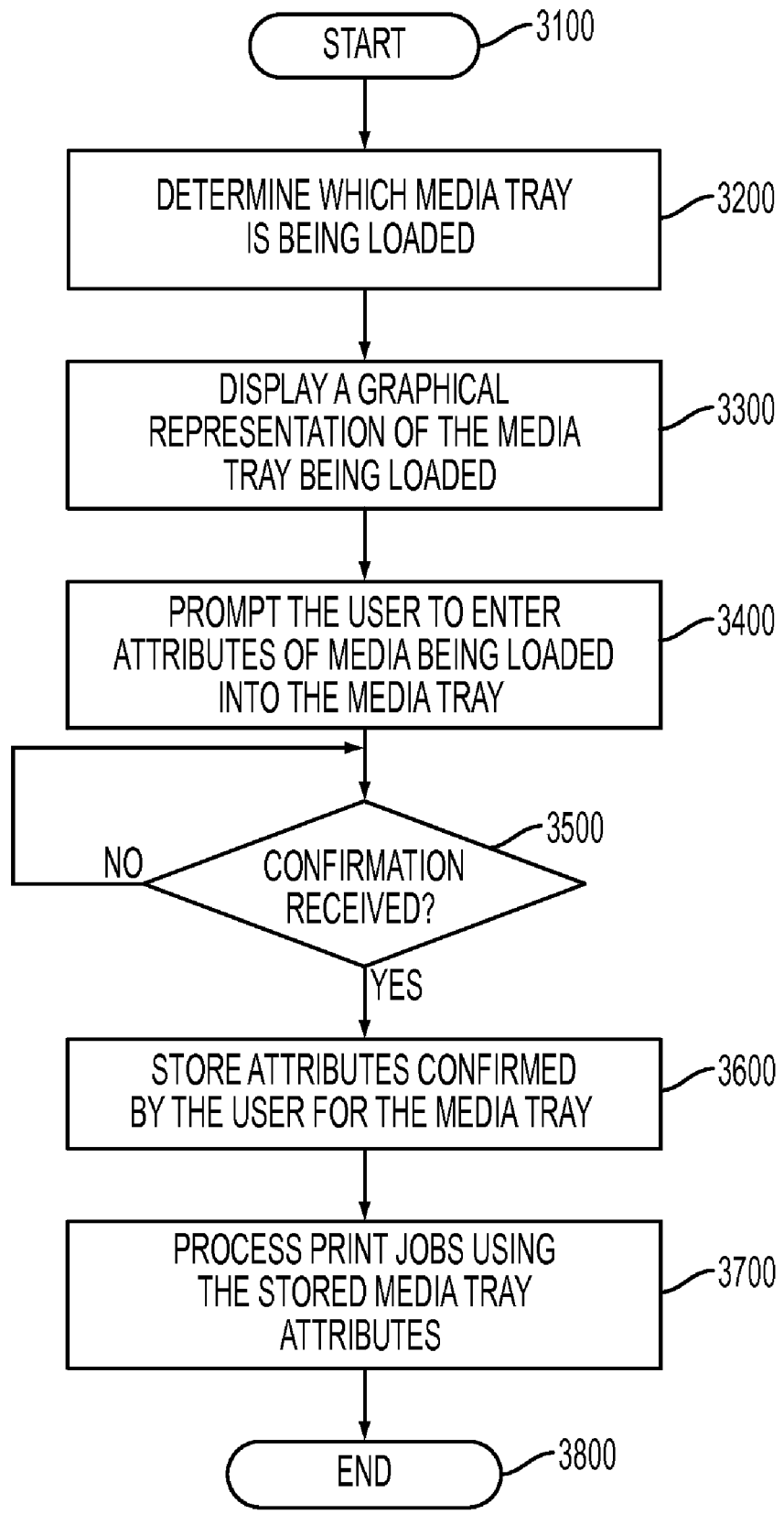
FIG. 3 is a flowchart of an exemplary media attribute confirming process in accordance with one possible embodiment of the disclosure.

FIG. 3 is a flowchart of a media tray confirmation process in accordance with one possible embodiment of the disclosure. The method begins at 3100, and continues to 3200 where the media tray sensor 295 may determine which the media tray 160 is being loaded with media.

Figure 4:
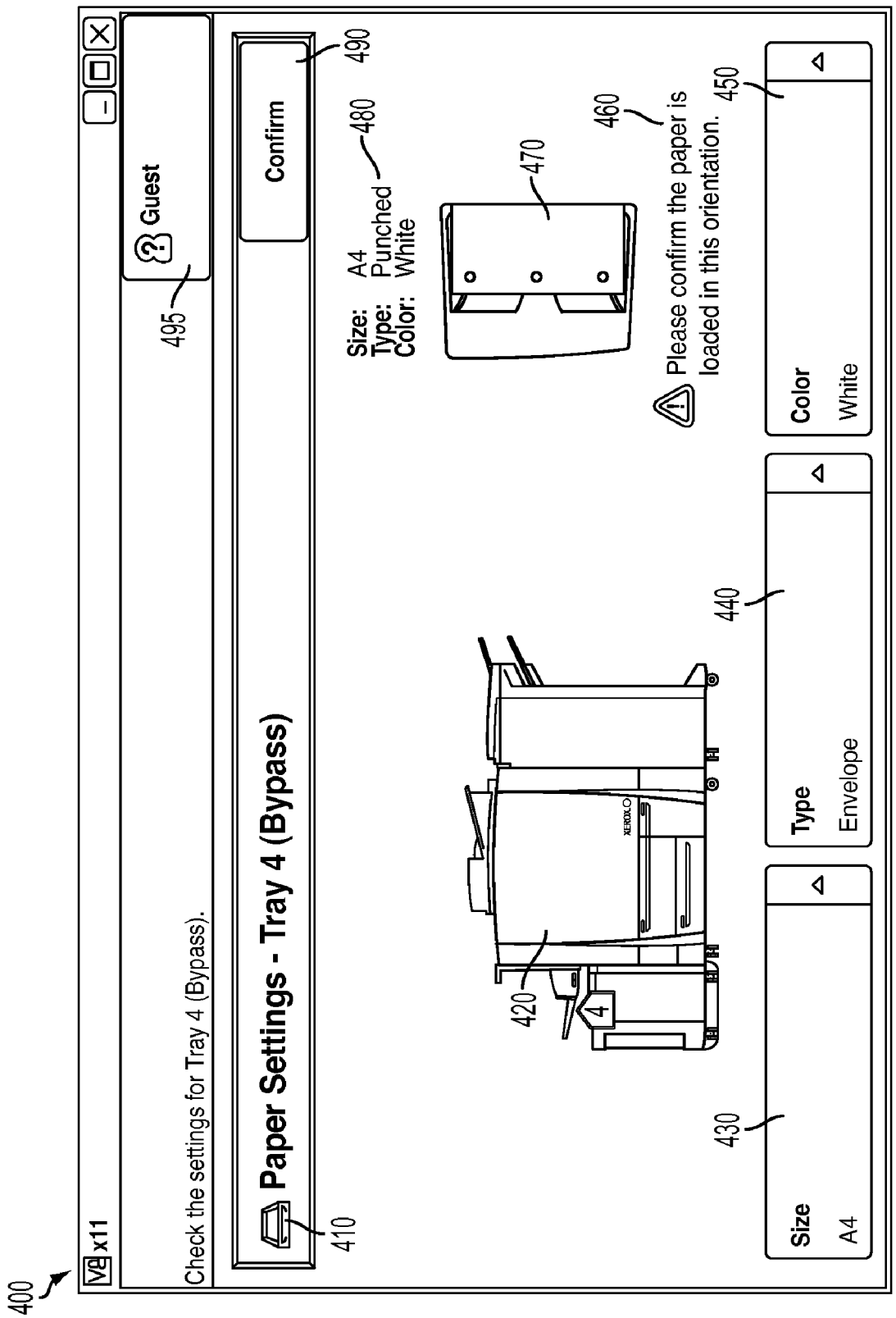
FIG. 4 is an exemplary screenshot of the user interface display when conducting the exemplary media attribute confirming process in accordance with one possible embodiment of the disclosure.
Figure 5:
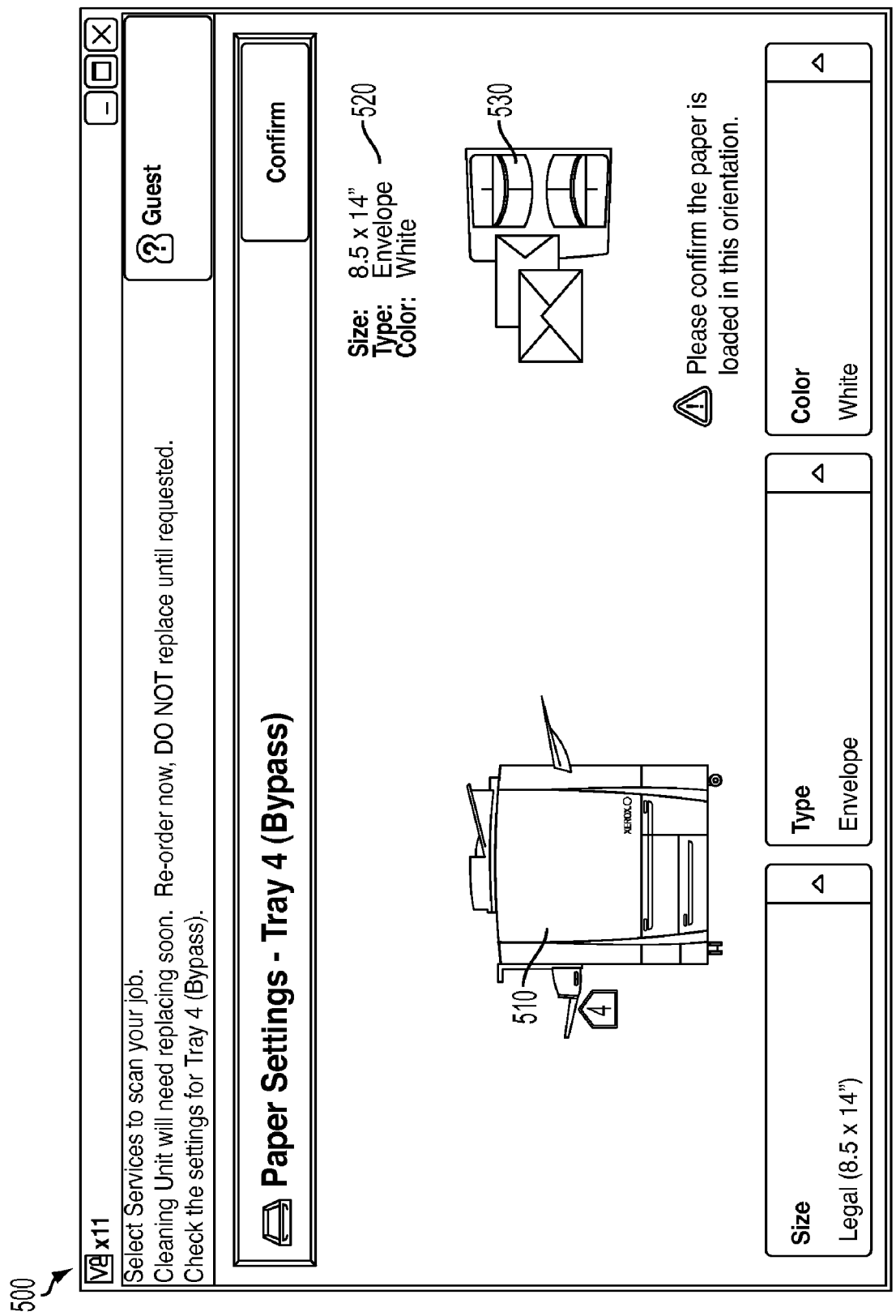
FIG. 5 is another exemplary screenshot of the user interface display when conducting the exemplary media attribute confirming process in accordance with one possible embodiment of the disclosure.

At step 3300, the media tray confirmation module 250 may cause a graphical representation of the media tray 160 being loaded to be displayed to a user on the user interface. FIGS. 4 and 5 show examples of screenshots from the user interface display 400, 500 with an example of a graphical representation (or icon) 470, 530 of a media tray 160 being loaded. The graphical representation 470 may show the feed orientation for the media in the media tray 160. FIG. 4 shows attributes 480 for the media tray 470 as white, punched, A4 media (e.g., paper) being loaded, while the FIG. 5 screenshot 500 shows attributes 520 for the media tray 530 as white, legal sized envelopes. The graphical representation 470 may also include an image 420 (or image 510 for FIG. 5) of the image production device 100 that contains the media trays being loaded. The user interface display 400 may include a media tray identity block 410 that identifies the media tray 160 being loaded. The user interface display 400 may also contain selection menus for media tray attributes, such as media size 430, media type 440, and media color 450. The media type 440 may contain selections for envelope, punched, label, or preprinted media, for example. A "guest" or help button 495 may also be included.

Returning to FIG. 3, at step 3400, the media tray confirmation module 250 may prompt the user to enter and confirm attributes 480 of the media being loaded into the media tray through the user interface 150. An example of such a prompt 460 is shown in the FIG. 4 user interface display 400 screenshot. The attributes 480 may be entered in any manner on a graphical user interface (GUI) as known to one of skill in the art, such as keyboard entry, touch screen entry, pull-down menus, etc., for example. The confirmation button 490 is provided so that the user may confirm the media tray attributes 480.

At step 3500, the media tray confirmation module 250 may determine if confirmation has been received from the user interface 150. If the media tray confirmation module 250 determines that confirmation of the media tray attributes 480 has not been received, the process returns to step 3400.

If at step 3500, the media tray confirmation module 250 determines that confirmation has been received from the user interface 150, at step 3600, the media tray confirmation module 250 may store the confirmed attributes 480 for the determined media tray 160 in the memory 230. At step 3700, the media tray confirmation module 250 may process print jobs using the stored media tray attributes 480. The process may then go to step 3800 and end.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hard-wired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein. It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for confirming attributes of media loaded in a media tray in an image production device, comprising:
    determining which media tray of one or more media trays is being loaded with media using one or more media tray sensors;
    displaying to a user on a user interface a graphical representation, the graphical representation including:
        an image of the image production device and the one or more media trays, and an image of the media tray being loaded, wherein the graphical representation of the image of the media tray being loaded shows a feed orientation for the media;
    prompting the user to enter and confirm attributes of the media being loaded into the media tray through the user interface, wherein the attributes are media type, media size, and media color, and the media type is one of envelope, punched, label, and preprinted media;

determining if confirmation has been received from the user interface, wherein if it is determined that the confirmation has been received from the user interface, storing the confirmed attributes for the determined media tray in a memory; and processing print jobs using the stored media tray attributes.

2. The method of claim 1, wherein the one or media sensors sense whether one or more media trays have been accessed by the user.

3. The method of claim 1, wherein the attributes are entered using pull-down menus on a graphical user interface.

4. The method of claim 1, wherein the image of the media tray being loaded is an icon of a media tray in the image production device.

5. The method of claim 1, wherein the graphical representation includes the entered attributes of the media being loaded into the media tray.

6. The method of claim 1, wherein the image production device is one of a copier, a printer, a facsimile device, and a multi-function device.

7. An image production device, comprising:
    a memory that stores media tray attributes of media contained in one or more media tray;
    a user interface that displays items to a user and receives inputs from the user;
    one or more media trays that store media used for image production;
    one or more media tray sensors that determine which media tray of the one or more media trays is being loaded with media; and
    a media tray confirmation module that causes a graphical representation to be displayed on a user interface, the graphical representation including an image of the image production device and the one or more media trays, and an image of the media tray being loaded, prompts the user to enter and confirm attributes of the media being loaded into the media tray through the user interface, determines if confirmation has been received from the user interface, wherein if the media tray confirmation module determines that the confirmation has been received from the user interface, the media tray confirmation module store the confirmed attributes for the determined media tray in a memory, and processes print jobs using the stored media tray attributes,
    wherein the image of the media tray being loaded shows a feed orientation for the media, the attributes are media type, media size, and media color, and the media type is one of envelope, punched, label, and preprinted media.

8. The image production device of claim 7, wherein the one or media sensors sense whether one or more media trays have been accessed by the user.

9. The image production device of claim 7, wherein the attributes are entered using pull-down menus on a graphical user interface.

10. The image production device of claim 7, wherein the image of the media tray being loaded is an icon of a media tray in the image production device.

11. The image production device of claim 7, wherein the graphical representation includes the entered attributes of the media being loaded into the media tray.

12. The image production device of claim 7, wherein the image production device is one of a copier, a printer, a facsimile device, and a multi-function device.

13. A non-transitory computer-readable medium storing instructions for controlling a computing device for confirming attributes of media loaded in a media tray in an image production device, the instructions comprising:
    determining which media tray of one or more media trays is being loaded with media using one or more media tray sensors;
    displaying a graphical representation to a user on a user interface, the graphical representation including an image of the image production device and the one or more media trays, and an image of the media tray being loaded to a user on a user interface, wherein the graphical representation shows a feed orientation for the media;
    prompting the user to enter and confirm attributes of the media being loaded into the media tray through the user interface, wherein the attributes are media type, media size, and media color, and the media type is one of envelope, punched, label, and preprinted media;
    determining if it is determined that confirmation has been received from the user interface, wherein if it is determined that confirmation has been received from the user interface,
    storing the confirmed attributes for the determined media tray in a memory; and
    processing print jobs using the stored media tray attributes.

14. The non-transitory computer-readable medium of claim 13, wherein the one or media sensors sense whether one or more media trays have been accessed by the user.

15. The non-transitory computer-readable medium of claim 13, wherein the attributes are entered using pull-down menus on a graphical user interface.

16. The non-transitory computer-readable medium of claim 13, wherein the image of the media tray being loaded is an icon of a media tray in the image production device.

17. The non-transitory computer-readable medium of claim 13, wherein the graphical representation includes the entered attributes of the media being loaded into the media tray.

18. The non-transitory computer-readable medium of claim 13, wherein the image production device is one of a copier, a printer, a facsimile device, and a multi-function device.

* * * * *